(12) United States Patent
Friedman et al.

(10) Patent No.: US 10,889,336 B2
(45) Date of Patent: Jan. 12, 2021

(54) POLYMERIC VEHICLE FLOOR

(71) Applicant: Ford Global Technologies, LLC, Dearborn, MI (US)

(72) Inventors: Peter A. Friedman, Ann Arbor, MI (US); John Wayne Jaranson, Dearborn, MI (US); Ari Garo Caliskan, Canton, MI (US); Christopher Bondanza, Grosse Pointe Shores, MI (US); Michael Musa Azzouz, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 133 days.

(21) Appl. No.: 16/221,762

(22) Filed: Dec. 17, 2018

(65) Prior Publication Data

US 2020/0189665 A1 Jun. 18, 2020

(51) Int. Cl.
| | | |
|---|---|---|
| *B62D 29/04* | (2006.01) |
| *B60H 1/00* | (2006.01) |
| *B60K 1/04* | (2019.01) |
| *B62D 25/20* | (2006.01) |
| *B60K 1/00* | (2006.01) |

(52) U.S. Cl.
CPC ....... *B62D 29/041* (2013.01); *B60H 1/00564* (2013.01); *B60K 1/04* (2013.01); *B62D 25/20* (2013.01); *B60K 2001/005* (2013.01); *B60K 2001/0438* (2013.01)

(58) Field of Classification Search
CPC .... B62D 29/043; B62D 25/20; B62D 25/025; B62D 29/041; B62D 29/001; B60H 1/00564; B60K 1/04; B60K 2001/005; B60K 2001/0438; B60Y 2306/01
USPC ...................................... 296/193.07
See application file for complete search history.

(56) References Cited

U.S. PATENT DOCUMENTS

| | | | |
|---|---|---|---|
| 5,129,700 A | 7/1992 | Trevisan et al. |
| 6,666,501 B1 | 12/2003 | Logan et al. |
| 7,104,595 B2 * | 9/2006 | Kamura ................. | B62D 21/10 296/1.03 |
| 7,111,900 B2 | 9/2006 | Chernoff et al. |
| 7,350,853 B2 | 4/2008 | Fitze |
| 7,641,266 B2 * | 1/2010 | Platto ................... | B60H 1/0055 296/193.06 |
| 8,814,255 B2 | 8/2014 | Yamaji et al. |
| 9,187,050 B2 | 11/2015 | Tanigaki et al. |
| 9,352,787 B2 * | 5/2016 | Hihara .................. | B62D 25/20 |
| 9,440,523 B2 | 9/2016 | Decker |
| 9,452,790 B2 * | 9/2016 | Peitz .................... | B62D 29/005 |
| 9,718,340 B2 | 8/2017 | Berger et al. |
| 9,862,427 B2 | 1/2018 | Berger et al. |
| 10,245,920 B2 * | 4/2019 | Shibayama ........ | B60H 1/00835 |

(Continued)

FOREIGN PATENT DOCUMENTS

| | | |
|---|---|---|
| JP | 5621370 B2 | 11/2014 |
| KR | 20180081000 A | 7/2018 |

*Primary Examiner* — Pinel E Romain
(74) *Attorney, Agent, or Firm* — David Coppiellie; Bejin Bieneman PLC (57) ABSTRACT

A vehicle includes a floor including a top panel and a bottom panel defining a cavity therebetween. At least one of the top panel and the bottom panel includes a polymeric material. A passenger-climate-control duct is disposed in the cavity and is integral with the at least one of the top panel and the bottom panel.

20 Claims, 6 Drawing Sheets

(56) References Cited

U.S. PATENT DOCUMENTS

| | | | | |
|---|---|---|---|---|
| 2003/0037972 | A1* | 2/2003 | Chernoff | B60K 1/00 |
| | | | | 180/65.1 |
| 2009/0230729 | A1 | 9/2009 | Lusk | |
| 2010/0117394 | A1 | 5/2010 | Teli et al. | |
| 2011/0179740 | A1* | 7/2011 | Padmanabhan | E04F 15/043 |
| | | | | 52/588.1 |
| 2012/0103714 | A1 | 5/2012 | Choi et al. | |
| 2014/0130657 | A1* | 5/2014 | Pilpel | B32B 5/12 |
| | | | | 89/36.02 |
| 2014/0300141 | A1 | 10/2014 | Hihara et al. | |
| 2017/0305249 | A1 | 10/2017 | Hara | |
| 2018/0297339 | A1* | 10/2018 | Fergusson | B32B 5/18 |
| 2019/0210537 | A1* | 7/2019 | Maier | B60R 7/04 |

* cited by examiner

POLYMERIC VEHICLE FLOOR

BACKGROUND

A vehicle includes a body defining a passenger cabin. The body may include a floor defining a lower boundary of the passenger cabin. A plurality of components may be attached to the floor of the body, e.g., wire harnesses, HVAC ducts, seats, etc. Occupants of the passenger cabin may walk across the floor of the vehicle during ingress and egress. The components may be positioned to provide designated space for the placement of feet of the occupant during ingress, egress, and while sitting in the vehicle, e.g., the seats, during operation of the vehicle.

DETAILED DESCRIPTION

A vehicle includes a floor including a top panel and a bottom panel defining a cavity therebetween. At least one of the top panel and the bottom panel includes a polymeric material. A passenger-climate-control duct is disposed in the cavity and is integral with the at least one of the top panel and the bottom panel.

The passenger-climate-control duct may extend from the bottom panel to the top panel.

The passenger-climate-control duct may be integral with the bottom panel and connected to the top panel.

The top panel may be sheet molding compound and the bottom panel may be injection molded plastic.

The passenger-climate-control duct may be injection molded plastic.

The top panel may include a peripheral edge and the bottom panel may include a peripheral edge connected to the peripheral edge of the top panel.

The vehicle may include rockers elongated in a vehicle-fore-and-aft direction. The peripheral edges of the top and bottom panels may be adjacent both rockers.

The vehicle may include a body defining a passenger cabin. The passenger-climate-control duct may be in fluid communication with the passenger cabin.

The passenger-climate-control duct may extend through the top panel.

The top panel may be generally planar.

The vehicle may include a floor cross member adjacent at least one of the top panel and the bottom panel.

At least one of the top panel and the bottom panel may be overmolded to the floor cross member.

The floor cross member may be between the top panel and the bottom panel.

The vehicle may include a seat mount supported by the floor cross member.

The top panel may include a planar portion, and the seat mount may be at the planar portion.

The vehicle may include a wire. At least one of the top panel and the bottom panel may be molded to the wire.

The vehicle may include an electrical connection extending through the top panel, and a wire connected to the electrical connection and extending along at least one of the top panel and the bottom panel.

The vehicle may include a battery. The bottom panel of the floor may be dispose between the battery and the top panel of the floor.

The vehicle may include a foil sheet on the bottom panel.

The vehicle may include a temperature-insulating material disposed in the cavity external to the passenger-climate-control duct.

With reference to the Figures, wherein like numerals indicate like parts throughout the several views, a vehicle 10 is generally shown. The vehicle 10 includes a floor 12 and a passenger-climate-control duct 14. The floor 12 includes a top panel 16 and a bottom panel 18 defining a cavity 20 therebetween. At least one of the top panel 16 and the bottom panel 18 includes a polymeric material. The passenger-climate-control duct 14 is disposed in the cavity 20 and is integral with the at least one of the top panel 16 and the bottom panel 18.

Integrating vehicle components into the floor 12 may assist in reducing assembly complexity and cost by making the vehicle components and the floor 12 a unitary component. For example, since the passenger-climate-control duct 14 is integral with at least one of the top panel 16 and the bottom panel 18, the passenger-climate-control duct 14 and the floor 12 are assembled to the vehicle 10 as a single unit, reducing assembly complexity and cost. Since at least one of the top panel 16 and the bottom panel 18 includes the polymeric material, at least one of the top panel 16 and the bottom panel 18 may be integral with other vehicle components, as set forth further below, which may assist in reducing assembly complexity and cost. Additionally, the floor 12 may house the vehicle components in the cavity 20, as set forth further below, thus reducing packaging constraints, which may be used to increase the size of a passenger compartment.

Figure 3B:
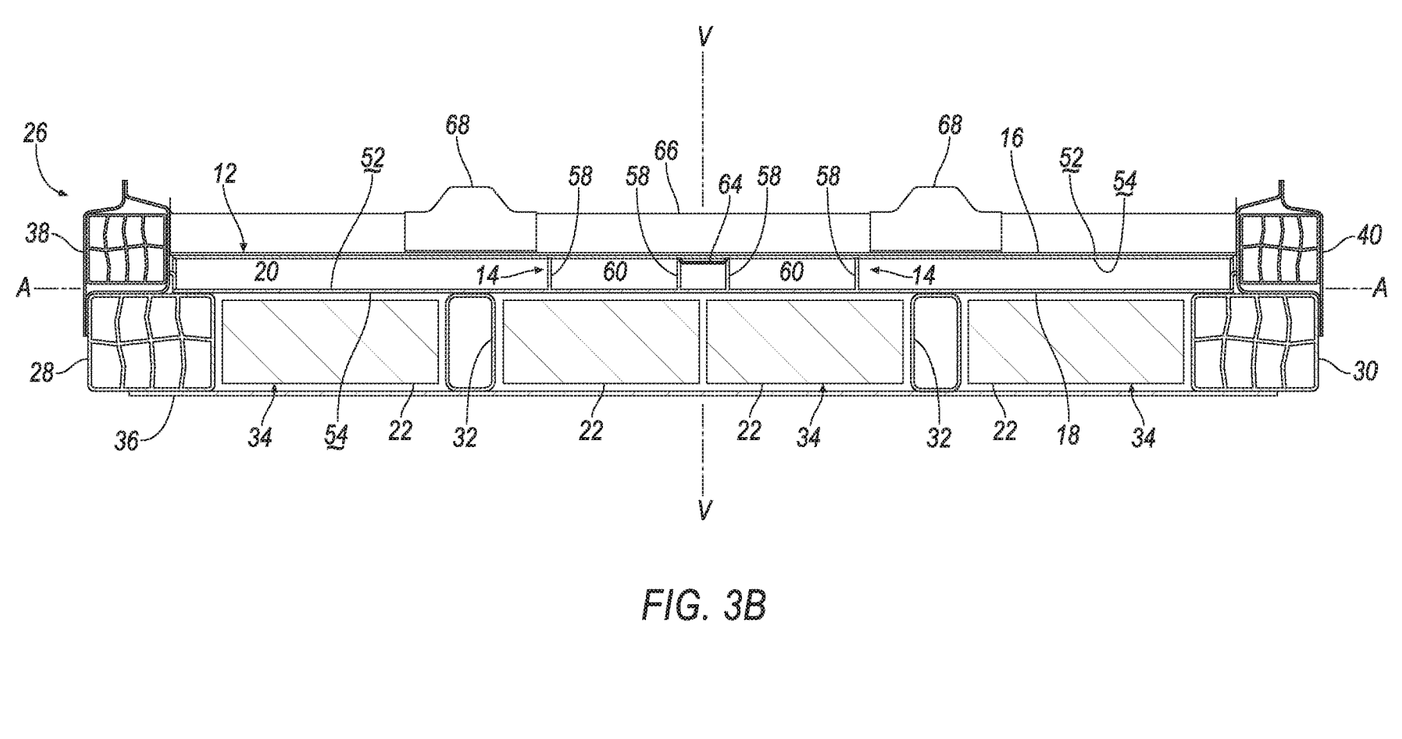
FIG. 3B is a cross-section view of the vehicle frame and the floor along line 3B.
Figure 4:
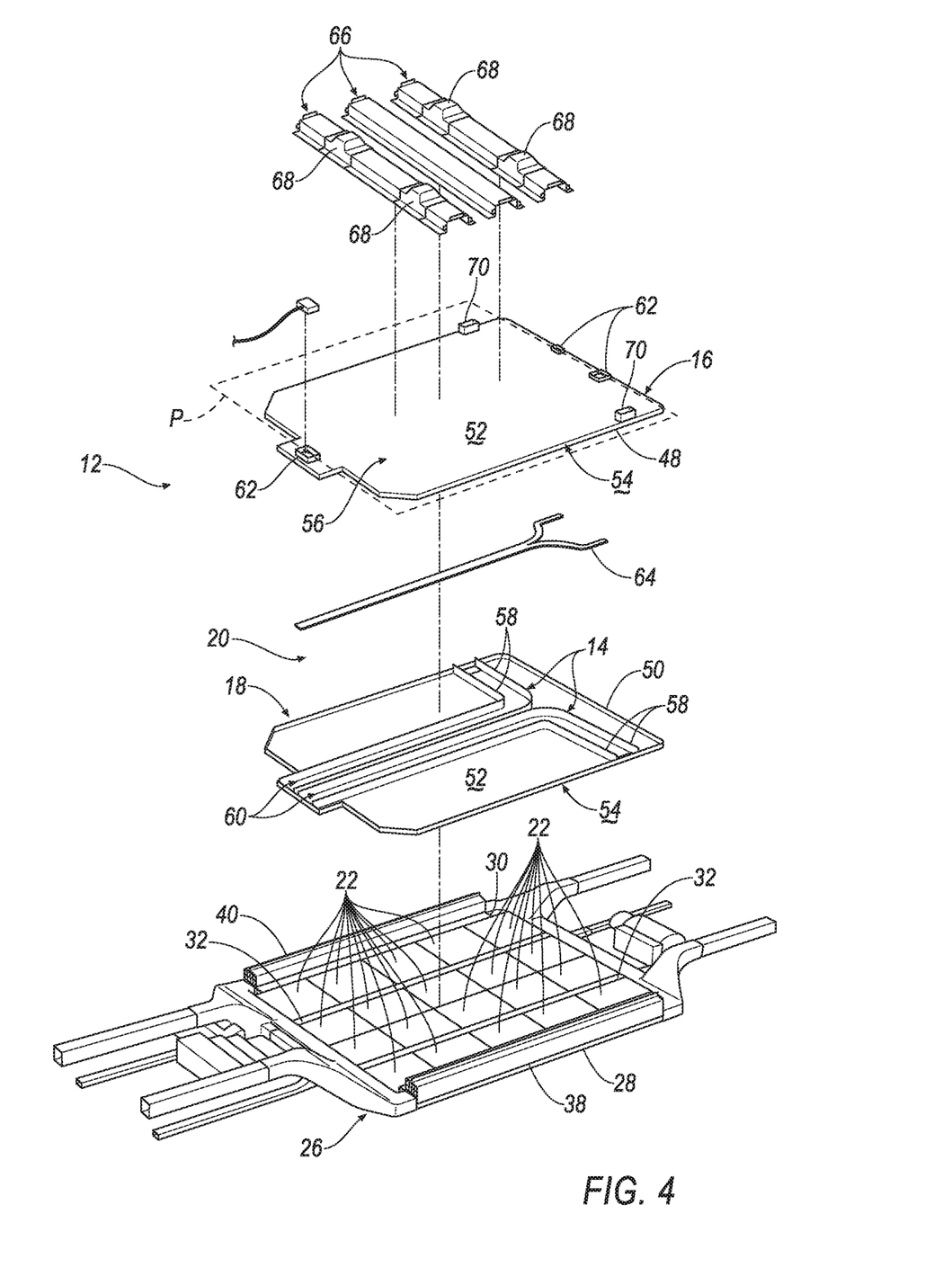
FIG. 4 is an exploded view of the vehicle frame and the floor including a top panel and a bottom panel.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. For example, the vehicle 10 may be an autonomous vehicle. In other words, the vehicle 10 may be autonomously operated such that the vehicle 10 may be driven without constant attention from a driver, i.e., the vehicle 10 may be self-driving without human input. As another example, the vehicle 10 may be an electric vehicle, e.g., a plug-in hybrid electric vehicle (PHEV), a hybrid electric vehicle (HEV), battery electric vehicle (BEV), etc. When electric, the vehicle 10 includes batteries 22, as shown in FIGS. 3B and 4. The batteries 22 may be of any suitable type for vehicular electrification, for example, lithium-ion batteries, nickel-metal hydride batteries, lead-acid batteries, or ultracapacitors, as used in, for example, PHEVs, HEVs, BEVs, etc.

Figure 1:
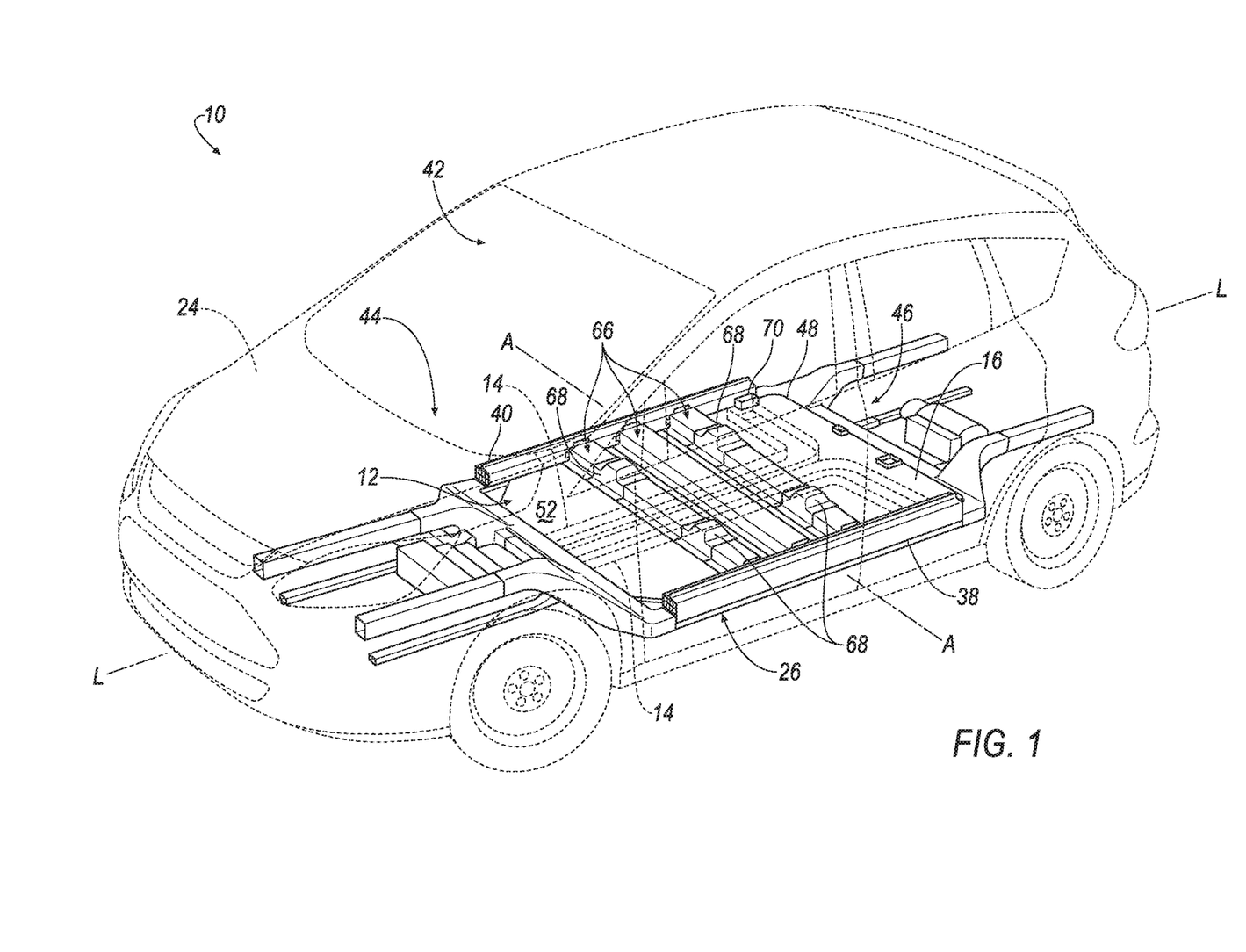
FIG. 1 is a perspective view of a vehicle including a vehicle body shown in hidden lines and a vehicle frame.
Figure 2:
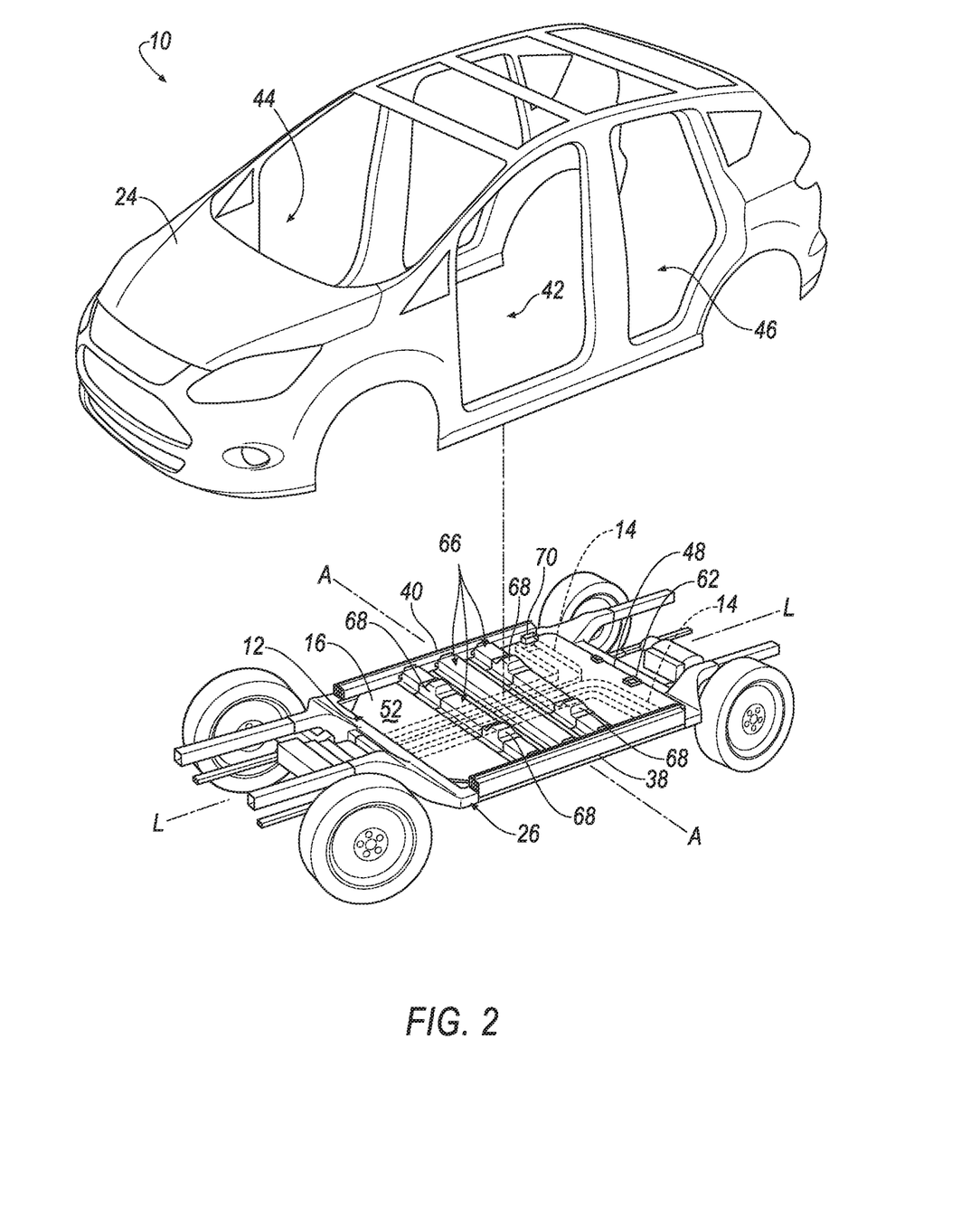
FIG. 2 is a perspective view of the vehicle frame and vehicle body separated from the vehicle frame.

As shown in FIGS. 1 and 2, the vehicle 10 may have a body-on-frame construction (also referred to as a cab-on-frame construction). In other words, the vehicle 10 includes a body 24 and a vehicle frame 26. The body 24 and the vehicle frame 26 are separate components, i.e., are modular, and the body 24 is supported on and affixed to the vehicle frame 26. As another example not shown in the Figures, the body 24 may be of a unibody construction. In the unibody construction, the body 24 is unitary, i.e., a continuous one-piece unit. Alternatively, the body 24 and the vehicle frame 26 may have any suitable construction. The body 24 and/or the vehicle frame 26 may be formed of any suitable material, for example, steel, aluminum, etc.

With reference to FIG. 1, the vehicle frame 26 may be elongated along a longitudinal axis L. In other words, a length of the vehicle frame 26 along the longitudinal axis L may be greater than a width of the vehicle frame 26 perpendicular to the longitudinal axis L, i.e., along a lateral axis A.

Figure 3A:
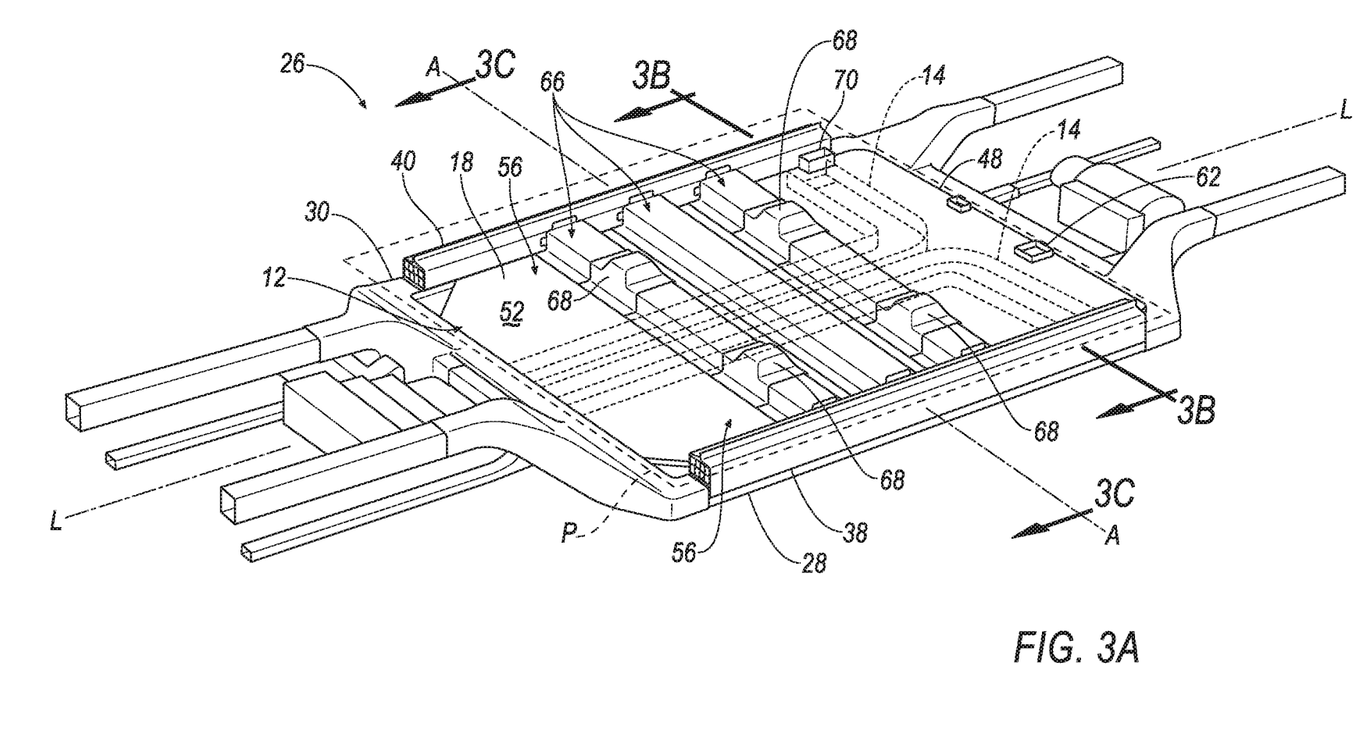
FIG. 3A is a perspective view of the vehicle frame with a floor.

With reference to FIG. 3A, the vehicle frame 26 includes a first rail 28 and a second rail 30. The first rail 28 and the second rail 30 are spaced from each other, e.g., along the lateral axis A. As set forth above, the rails are elongated along the longitudinal axis L. The first rail 28 and the second rail 30 may be mirror images of each other or may be different from each other.

The vehicle frame 26 may include a longitudinal beam 32. As an example, the vehicle frame 26 may include more than one longitudinal beams 32, for example, the vehicle frame 26 shown in FIG. 3B includes two longitudinal beams 32. The longitudinal beams 32 may be between the first rail 28 and the second rail 30. The longitudinal beam 32 may be elongated along the longitudinal axis L. The longitudinal beams 32 may, for example, be elongated in parallel with the first rail 28 and the second rail 30.

With reference to FIGS. 3B and 4, when electric, the vehicle frame 26 may include at least one battery compartment 34, and the batteries 22 are disposed in the battery compartment 34. In the example shown in FIGS. 3B and 4, the vehicle frame 26 includes three battery compartments 34. The battery compartments 34 are defined between the first rail 28, the second rail 30, and the longitudinal beams 32. For example, in the example shown in FIGS. 3B and 4, one battery compartment 34 is between the first rail 28 and one of the longitudinal beams 32, another battery compartment 34 is between the two longitudinal beams 32, and another battery compartment 34 is between the second rail 30 and one of the longitudinal beams 32. This configuration reduces packaging constraints in the battery compartments 34 and allows for larger, uninterrupted areas in the battery compartments 34.

The batteries 22 are supported by the vehicle frame 26. Specifically, the batteries 22 are disposed in the battery compartments 34, as shown in FIGS. 3B and 4. The batteries 22 may be supported by the first and second rail and/or the longitudinal beams 32, i.e., the weight of the batteries 22 may be directly or indirectly borne by first rail, the second rail 30, and/or at least one of the longitudinal beams 32. As an example, the batteries 22 may be directly connected laterally to the first rail 28, the second rail 30, and/or at least one of the longitudinal beams 32. As another example, the batteries 22 may be directly connected to components above and/or below the batteries 22, e.g., an underbody panel as described below.

With reference to FIG. 3B, the vehicle frame 26 may include an underbody panel 36. The first rail 28, the second rail 30, and the longitudinal beams 32 may be disposed between the underbody panel 36 and the floor 12, e.g., the bottom panel 18. The underbody panel 36 is beneath the first rail 28, the second rail 30, and the longitudinal beams 32. The underbody panel 36 may be metal, plastic, or any suitable material. The battery compartments 34 are above the underbody panel 36, i.e., between the underbody panel 36 and the floor 12. The underbody panel 36 may prevent intrusion of dirt, precipitation, etc., from the road surface into the battery compartment 34.

With reference to FIGS. 2 and 3A, the body 24 includes a first rocker 38 and a second rocker 40 each elongated in a vehicle-fore-and-aft direction, i.e., in along the longitudinal axis L. The first rocker 38 and the second rocker 40 are spaced from each other along the lateral axis A, i.e., in a cross-vehicle direction, and may be at outboard ends of the body 24. The first rocker 38 and the second rocker 40 may each be one piece or may each be formed of multiple pieces fixed together, e.g., by welding and/or fasteners. The first rocker 38 and the second rocker 40 may be at a bottom of the body 24. Other components of the body 24, e.g., pillars, may extend upwardly from the first rocker 38 and the second rocker 40.

With reference to FIGS. 3A and 3B, the first rocker 38 may be supported by the first rail 28, and the second rocker 40 may be supported by the second rail 30. Specifically, the first rocker 38 may abut the first rail 28 and the second rocker 40 may abut the second rail 30. The first rocker 38 and the second rocker 40 may be directly connected to the first rail 28 and the second rail 30, respectively, e.g., by welds, threaded fasteners, etc.

The body 24 of the vehicle 10 defines the passenger cabin 42, as shown in FIGS. 1 and 2. The passenger cabin 42 houses occupants, if any, of the vehicle 10. The passenger cabin 42 includes a front 44 and a rear 46 spaced from each other along the longitudinal axis L. The front 44 of the passenger cabin may include a bulkhead (not numbered). The bulkhead may support a plurality of vehicle components including, e.g., an instrument panel. The first rocker 38 and the second rocker 40 may define an outer boundary of the passenger cabin 42. In other words, the passenger cabin 42 extends from the first rocker 38 to the second rocker 40 along the lateral axis A.

The floor 12 may define the lower boundary of the passenger cabin 42. Specifically, the top panel 16 may define the lower boundary of the passenger cabin 42. In other words, the top panel 16 may be disposed between the bottom panel 18 and the passenger cabin 42. The top panel 16 and the bottom panel 18 may each include a peripheral edge 48, 50, as shown in FIG. 4. The peripheral edge of the top panel 16 extends entirely around the top panel 16, and the peripheral edge 50 of the bottom panel 18 extends entirely around the bottom panel 18. For example, the peripheral edges 48, 50 of the top panel 16 and the bottom panel 18 are adjacent to both rockers 38, 40. In other words, the top panel 16 and the bottom panel 18 extend along the lateral axis A to each rocker 38, 40. Additionally, the peripheral edges 48, 50 of the top panel 16 and the bottom panel 18 are adjacent to both the front 44 and the rear 46 of the passenger cabin 42. In other words, the top panel 16 and the bottom panel 18 are elongated along the longitudinal axis L from the front 44 to the rear 46 of the passenger cabin 42. Said differently, the peripheral edges 48, 50 of the top panel 16 and the bottom panel 18 extend along both rockers 38, 40 and both the front 44 and the rear 46 of the passenger cabin 42.

The floor 12, i.e., the top panel 16 and the bottom panel 18, may be supported by the rockers 38, 40. For example, the floor 12, i.e., the top panel 16 and the bottom panel 18, may be directly connected to each rocker 38, 40. In other words, the peripheral edges 48, 50 of the top pane and the bottom panel 18 may be directly connected to each rocker 38, 40. The floor 12 may be connected to each rocker 38, 40 in any suitable manner, e.g., welding, vibration welding, ultrasonic welding, adhesive, fasteners, etc. The floor 12 may be connected to each rocker 38, 40 in a same or different manner as the floor 12 cross member.

Additionally, the floor 12, e.g., the peripheral edges 48, 50 of the top panel 16 and the bottom panel 18, may be fixed to the front 44 and the rear 46 of the passenger cabin 42. The floor 12 may be connected to the front 44 and the rear 46 of the passenger cabin 42 in any suitable manner, e.g., welding, vibration welding, ultrasonic welding, adhesive, fasteners, etc. The floor 12 may be connected to the front 44 and the rear 46 of the passenger cabin 42 in a same or different manner as each rocker 38, 40.

Additionally, when the vehicle 10 has a body-on-frame construction, i.e., includes the vehicle frame 26, the floor 12 may be supported by the vehicle frame 26. For example, the floor 12 may abut the vehicle frame 26, as shown in FIG. 3B. Specifically, the bottom panel 18 of the floor 12 may abut the vehicle frame 26, e.g., the first rail 28, the second rail 30, and the longitudinal beams 32. The bottom panel 18 of the floor 12 may be fixed to the vehicle frame 26, e.g., at least one of the first rail 28, the second rail 30, and the longitudinal beam 32. The floor 12 may be fixed to the vehicle frame 26 in any suitable manner, e.g., vibration welding, ultrasonic welding, adhesive, welding, fasteners, etc.

As set forth above, the top panel 16 and the bottom panel 18 may be elongated along the longitudinal axis L, e.g., from the front 44 of the passenger cabin 42 to the rear 46 of the passenger cabin 42, and extend along the lateral axis A, e.g., from the first rocker 38 to the second rocker 40. The top panel 16 and the bottom panel 18 each may be thin along a vertical axis V transverse to the longitudinal axis L and the lateral axis A, as shown in FIG. 3B. Said differently, the top panel 16 and the bottom panel 18 may be "sheet like."

The top panel 16 and the bottom panel 18 may each include an upper surface 52 and a lower surface 54. The upper surface 52 of the top panel 16 may face the passenger cabin 42, i.e., upwardly. The lower surface 54 of the bottom panel 18 may face downwardly, e.g., the vehicle frame 26 and/or the road. The upper surface 52 of the bottom panel 18 and the lower surface 54 of the top panel 16 may, for example, face each other, as shown in FIG. 3B. In other words, the upper surface 52 of the bottom panel 18 and the lower surface 54 of the top panel 16 may define the cavity 20. The cavity 20 may house a plurality of vehicle components, e.g., wire harnesses, ducts, etc., which may provide additional space for an occupant in the vehicle 10. For example, the components may be integral with one of the top panel 16 and the bottom panel 18, as set forth below. Alternatively, the components may be separate parts disposed in the cavity 20 and fixed to one of the top panel 16 and the bottom panel 18. Additionally, the cavity 20 may dampen exterior noise, which may improve the noise, vibration, and harshness (NVH) in the vehicle 10.

The upper surface 52 may include a planar portion 56. In other words, at least a portion of the upper surface 52 is flat. The upper surface 52 may include any suitable number of planar portions 56. For example, the top panel 16 may be generally planar. In other words, the upper surface 52 of the top panel 16 may extend entirely in a plane P, as shown in FIGS. 3A and 4, i.e., the entire upper surface 52 may be flat. Said differently, in such an example, the entire upper surface 52 of the top panel 16 is the planar portion 56. As another example, the upper surface 52 may include a plurality of planar portions 56. In this situation, the upper surface 52 may include a contour portion (not shown) extending between each planar portion 56. The planar portion 56 may be any suitable size, e.g., extending along the longitudinal axis L and the lateral axis A.

The top panel 16 and the bottom panel 18 may be integral, i.e., formed simultaneously as a one-piece construction. For example, the top panel 16 and the bottom panel 18 may be formed simultaneously by injection molding, blow molding, casting, etc., as set forth further below. In alternative to being integral, the top panel 16 and the bottom panel 18 may be formed separately and subsequently joined. For example, the top panel 16 and the bottom panel 18 may be formed separately and subsequently joined by fusing, fastening, adhesive, etc. In this situation, the top panel 16 is connected to the bottom panel 18. Specifically, the peripheral edge 50 of the bottom panel 18 is connected to the peripheral edge 48 of the top panel 16. In other words, the top panel 16 is connected to the bottom panel 18 entirely around the periphery. The top panel 16 may be connected to the bottom panel 18 in any suitable manner, e.g., vibration welding, ultrasonic welding, adhesive, fasteners, etc.

At least one of the top panel 16 and the bottom panel 18 includes the polymeric material, as set forth above. The top panel 16 and the bottom panel 18 may be a same or different material. The at least one of the top panel 16 and the bottom panel 18 may be any suitable polymeric material, e.g., injection molded plastic, sheet molding compound, fiber reinforced plastic, etc. For example, the top panel 16 and the bottom panel 18 may be different polymeric materials. In this situation, the bottom panel 18 may, for example, be injection molded plastic and the top panel 16 may, for example, be sheet molding compound (SMC). Injection molded plastic is a structural description of the type of plastic, not the process by which it is made. When injection molded plastic, the bottom panel 18 may is single uniform piece of material having a shape that conforms to an injection mold with no seams or joints. In order to be injection molded plastic, the bottom panel 18 may lack overhangs and undercuts in a particular direction. Sheet molding compound is a structural description of the type of plastic, not the process by which it is made. Sheet molding compound may include fibers completely integrated with and reinforcing a resin material. Sheet molding compound (SMC) is light weight when compared to metal and bulk molding compound (BMC). The sheet molding compound is a single, uniform material having a shape that conforms to a compression mold. As another example, the top panel 16 and the bottom panel 18 may be the same polymeric material. As yet another example, the other of the top panel 16 and the bottom panel 18 may be any other suitable material, e.g., steel, aluminum, etc.

The at least one of the top panel 16 and the bottom panel 18 may include any suitable amount of polymeric material. For example, the at least one of the top panel 16 and the bottom panel 18 may be entirely polymeric material, e.g., injection molded plastic. As another example, one of the top panel 16 and the bottom panel 18 may be insert molded. In this situation, one of the top panel 16 and the bottom panel 18 may include a metal sheet, e.g., steel, aluminum, etc., molded in polymeric material. In other words, the polymeric material may be a single, uniform piece of material with no seams or joints, and may be fixed to the metal without fasteners or adhesives holding the polymeric material and the metal together. In this situation, the polymeric material may extend partially, e.g., along the surface 52, 54 of the at least one of the top panel 16 and the bottom panel 18 defining the cavity 20, or entirely around the metal sheet.

The vehicle 10 may include any suitable number of passenger-climate-control ducts. For example, the vehicle 10 may include two passenger-climate-control ducts, as shown in the Figures. In this situation, one passengerclimate-control duct 14 may be disposed on each side of the longitudinal axis L, as shown in FIG. 3A. In other words, one passenger-climate-control duct 14 is disposed between the first rocker 38 and the longitudinal axis L and the other passenger-climate-control duct 14 is disposed between the longitudinal axis L and the second rocker 40. The passenger-climate-control duct 14 may be elongated along the longitudinal axis L, e.g., from the front 44 of the passenger cabin 42 toward the rear 46 of the passenger cabin 42. The passenger-climate-control duct 14 may, for example, extend from the front 44 to the rear 46 of the passenger cabin 42 along the longitudinal axis L, i.e., straight across the floor 12. Alternatively, the passenger-climate-control duct 14 may curve toward one rocker 38, 40. For example, one passenger-climate-control duct may curve toward the first rocker 38 and the other passenger-climate-control duct may curve toward the second rocker 40, as shown in the Figures.

With reference to FIG. 3B, the passenger-climate-control duct 14 may, for example, extend from the bottom panel 18 to the top panel 16 along the vertical axis V. Specifically, the passenger-climate-control duct 14 may include sides 58 extending from the bottom panel 18 to the top panel 16. In other words, the sides 58 may extend from the upper surface 52 of the bottom panel 18 to the lower surface 54 of the top panel 16. The sides 58 may be spaced from each other along the lateral axis A. The sides 58 may be elongated along the longitudinal axis L, e.g., from the front 44 of the passenger cabin 42 towards the rear 46 of the passenger cabin 42, as shown in FIG. 4. The sides 58 may define a void 60 therebetween. Air may flow through the void 60 of the passenger-climate-control duct 14. As another example, the passenger-climate-control duct 14 may be spaced from one of the lower surface 54 of the top panel 16 and the upper surface 52 of the bottom panel 18. In this situation, the passenger-climate-control duct 14 may include a wall (not shown) extending from one side to the other side. In this situation, the wall may partially define the void 60. The wall may be spaced from one of the top panel 16 and the bottom panel 18, e.g., one of the upper surface 52 of the bottom panel 18 and the lower surface 54 of the top panel 16.

The passenger-climate-control duct 14 may extend through the top panel 16. For example, the passenger-climate-control duct 14 may extend through the top panel 16 to an instrument panel. In other words, the passenger-climate-control duct 14 may be in communication with the instrument panel. As another example, the passenger-climate-control duct 14 may include a floor duct 70 extending through the top panel 16 into the passenger cabin 42. In other words, the passenger-climate-control duct 14 may be in fluid communication with the passenger cabin 42 through the floor duct 70. The passenger-climate-control duct 14 may include any suitable number of floor ducts 70. For example, each passenger-climate-control duct 14 may include one floor duct 70 extending through the top panel 16 adjacent the rear 46 of the passenger cabin 42, as shown in the Figures. In this situation, the passenger-climate-control duct 14 may assist in regulating the temperature of the rear 46 of the passenger cabin 42.

The passenger-climate-control duct 14 is integral with at least one of the top panel 16 and the bottom panel 18, as set forth above. For example, the passenger-climate-control duct 14 may be integral with the bottom panel 18. In this situation, the passenger-climate-control duct 14 and the bottom panel 18 may be formed together as a unit. In other words, the top panel 16 may be formed separately from the bottom panel 18 and the passenger-climate-control duct 14. In this situation, the passenger-climate-control duct 14 may be connected to the top panel 16, e.g., by fasteners, vibration welding, ultrasonic welding, adhesive, etc. As another example, the passenger-climate-control duct 14 may be integral with the top panel 16, i.e., formed together as a unit. In this situation, the passenger-climate-control duct 14 may be connected to the bottom panel 18, e.g., by fasteners, vibration welding, ultrasonic welding, adhesive, etc. As yet another example, the passenger-climate-control duct 14 may be integral with both the top panel 16 and the bottom panel 18. In other words, the top panel 16, the bottom panel 18, and the passenger-climate-control duct 14 may be formed together as a unit.

The passenger-climate-control duct 14 may be any suitable material, e.g., a polymeric material. The passenger-climate-control duct 14 may be a same or different material as the at least one of the top panel 16 and the bottom panel 18. For example, the passenger-climate-control duct 14 may be injection molded plastic, i.e., a single, uniform part without joints or seams. The passenger-climate-control duct 14 may, for example, be molded together with at least one of the top panel 16 and the bottom panel 18, i.e., the passenger-climate-control duct 14 and the at least one of the top panel 16 and the bottom panel 18 is a single, uniform part without joints or seams.

As another example, the at least one of the top panel 16 and the bottom panel 18 may be overmolded to the passenger-climate-control duct 14. In this situation, the passenger-climate-control duct 14 may be injection molded plastic and the at least one of the top panel 16 and the bottom panel 18 may be plastic molded over the passenger-climate-control duct 14. In other words, at least one of the top panel 16 and the bottom panel 18 may encompass, i.e., be molded around, at least a portion of the passenger-climate-control duct 14. In this situation, the at least one of the top panel 16 and the bottom panel 18 is fixed to the passenger-climate-control duct 14 without fasteners or adhesives holding the at least one of the top panel 16 and the bottom panel 18 to the passenger-climate-control duct 14.

As another example, when the passenger-climate-control duct 14 is integral with both the top panel 16 and the bottom panel 18, the passenger-climate-control duct 14, the top panel 16, and the bottom panel 18 may be extruded plastic. In order to be extruded, the surfaces of the top panel 16, the bottom panel 18, and the passenger-climate-control duct 14 may be straight, that is, lacking overhangs, undercuts, curves, etc. in one direction, e.g., horizontally, e.g., in the direction of the longitudinal axis L. In other words, top panel, the bottom panel 18, and the passenger-climate-control duct 14 may have a cross-section that is constant in the one direction. That one direction may be the direction of extrusion.

Alternatively, the passenger-climate-control duct 14 may be, for example, a metal. In this situation, the passenger-climate-control duct 14 may be insert molded into the at least one of the top panel 16 and the bottom panel 18. In other words, the at least one of the top panel 16 and the bottom panel 18 may be a single, uniform piece of material with no seams or joints, and may be fixed to the passenger-climate-control duct 14 without fasteners or adhesives holding the at least one of the top panel 16 and the bottom panel 18 and the passenger-climate-control duct 14 together. In this situation, the at least one of the top panel 16 and the bottom panel 18 may encompass, i.e., be molded around, a portion of the sides 58 of the passenger-climate-control duct 14, e.g., to fixed the sides 58 to the at least one of the top panel 16 and the bottom panel 18.

An electrical connection 62 may extend through the top panel 16, e.g., into the passenger cabin 42, as shown in the Figures. The vehicle 10 may include any suitable number of electrical connections 62 extending through the top panel 16. The vehicle 10 may, for example, include three electrical connections 62. For example, one electrical connection 62 may be disposed adjacent to the front 44 of the passenger cabin 42 and two electrical connections 62 may be disposed adjacent to the rear 46 of the passenger cabin 42, as shown in FIG. 4. The two electrical connections 62 disposed adjacent to the rear 46 of the passenger cabin 42 may be spaced from each other along the lateral axis A. The electrical connections 62 may be in communication with vehicle components. For example, the electrical connection 62 at the front 44 of the passenger cabin 42 may be in communication with, e.g., an instrument panel, a body control module, batteries 22, seats, etc., and the electrical connections 62 at the rear 46 of the passenger cabin 42 may be in communication with, e.g., a rear window, tail lights, seats, batteries 22, etc.

A wire 64 may be connected to the electrical connections 62. For example, the wire 64 may extend between the electrical connections 62. As another example, the wire 64 may extend from one electrical connection 62 to any suitable vehicle component, e.g., a control module, an instrument panel, seats, batteries 22, etc. For example, the wire 64 may be connected to each electrical connection 62. In other words, the wire 64 establishes communication between electrical connections 62. In this situation, the wire 64 may be elongated along the longitudinal axis L. The wire 64 may split, i.e., fork, adjacent to the rear 46 of the passenger cabin 42 to connect to each electrical connection 62 adjacent the rear 46 of the passenger cabin 42, as shown in FIG. 4. The wire 64 may be any suitable type of wire 64, e.g., a low-current wire.

The wire 64 may extend along the at least one of the top panel 16 and the bottom panel 18. In other words, the wire 64 may abut the at least one of the top panel 16 and the bottom panel 18 along the longitudinal axis L. For example, the wire 64 may extend along the top panel 16, as shown in FIG. 3B. The at least one of the top panel 16 and the bottom panel 18 may, for example, be molded to the wire 64. In this situation, the wire 64 may be insert molded into the at least one of the top panel 16 and the bottom panel 18. In other words, the at least one of the top panel 16 and the bottom panel 18 may be molded at least partially around the wire 64, e.g., to encompass part of the wire 64 to fix the wire 64 to the at least one of the top panel 16 and the bottom panel 18.

As another example, the wire 64 may be disposed in a channel (not shown) on one of the top panel 16 and the bottom panel 18. The channel may be elongated along the longitudinal axis L, e.g., from the front 44 to the rear 46 of the passenger cabin 42. The channel may, for example, be disposed in the cavity 20, e.g., on one of the upper surface 52 of the bottom panel 18 and the lower surface 54 of the top panel 16. In this situation, the channel may extend away from the cavity 20. Alternatively, the channel may be disposed on the upper surface 52 of the top panel 16, i.e., inside the passenger cabin 42. In this situation, the channel may extend toward the cavity 20.

The channel may, for example, be integral with the at least one of the top panel 16 and the bottom panel 18. In other words, the channel and the at least one of the top panel 16 and the bottom panel 18 may be formed together as a single unit. For example, the channel and the at least one of the top panel 16 and the bottom panel 18 may be injection molded plastic. As another example, the channel and the at least one of the top panel 16 and the bottom panel 18 may be extruded plastic. As another example, the at least one of the top panel 16 and the bottom panel 18 may be overmolded to the channel. As yet another example, the channel may be insert molded to the at least one of the top panel 16 and the bottom panel 18. Alternatively, the channel and the at least one of the top panel 16 and the bottom panel 18 may be separately formed and subsequently assembled together, e.g., fixed together by fasteners, welding, etc. In this situation, the channel may be any suitable material, e.g., plastic, metal, etc.

An insulating material (not shown) may be disposed in the cavity 20 external to the passenger-climate-control duct 14. In other words, the insulating material may be disposed external to the void 60 in the passenger-climate-control duct 14. In this situation, the insulating material may be disposed between the sides 58 of the passenger-climate-control duct 14 and the peripheral edges 48, 50 of the top panel 16 and the bottom panel 18, i.e., the rockers 38, 40. The insulating material may extend from the rockers 38, 40 to the sides 58 of the passenger-climate-control duct 14. Alternatively, the insulating material may be spaced from the rockers 38, 40 and/or the sides 58. The insulating material may, for example, extend from the bottom panel 18 to the top panel 16, i.e., entirely across the cavity 20 along the vertical axis V. As another example, the insulating material may be spaced from the top panel 16. As yet another example, the insulating material may be a coating applied to the top panel 16, the bottom panel 18, or other components disposed in the cavity 20.

The insulating material may, for example, be a temperature-insulating material. In other words, the temperature-insulating material may assist in reducing the temperature gradient along the sides 58 of the passenger-climate-control duct 14, which may assist in maintaining the temperature of the air in the void 60 of the passenger-climate-control duct 14. In this situation, the temperature-insulating material may be any suitable material, e.g., ceramic, polystyrene foam, urethane foam, glass wool, etc. As another example, the insulating material may be an acoustic-insulating material. In other words, the acoustic-insulating material may assist in reducing the noise, vibration, and harshness (NVH) of the vehicle 10. In this situation, the acoustic-insulating material may be any suitable material, e.g., rubber, foam, resin, etc.

The body 24 may include a floor cross member 66. The floor cross member 66 is elongated along the lateral axis A, as shown in the Figures. For example, the floor cross member 66 may be elongated from the first rocker 38 to the second rocker 40. The floor cross member 66 may be directly connected to the first rocker 38 and the second rocker 40, i.e., a common connection engages both the floor cross member 66 and the first rocker 38 and a common connection engages both the floor cross member 66 and the second rocker 40. The floor cross member 66 may, for example, be directly connected to the first rocker 38 and the second rocker 40 by welds, threaded fasteners, unitary construction, etc. Alternatively, the floor cross member 66 may be elongated from the first rail 28 to the second rail 30. In this situation, the floor cross member 66 may be directly connected to the first rail 28 and the second rail 30, e.g., by welds, fasteners, unitary construction, etc. In other words, the floor cross member 66 may be fixed to the vehicle frame 26. The body 24 may include more than one floor cross member 66.

The floor cross member 66 may be adjacent at least one of the top panel 16 and the bottom panel 18. For example, the floor cross member 66 may be disposed in the passenger cabin 42, as shown in the Figures. In other words, the top panel 16 may be between the floor cross member 66 and the bottom panel 18. In this situation, the floor cross member 66 may be disposed on the top panel 16, e.g., the upper surface 52 of the top panel 16. As another example, the floor cross member 66 may be disposed in the cavity 20. In other words, the floor cross member 66 may between the top panel 16 and the bottom panel 18. In this situation, the floor cross member 66 may abut at least one of the bottom panel 18 and the top panel 16. For example, the floor cross member 66 may be disposed on the bottom panel 18 and extend to the top panel 16. As another example, the floor cross member 66 may be disposed on the bottom panel 18 and spaced from the top panel 16. As yet another example, the floor cross member 66 may abut the top panel 16, e.g., the lower surface 54, and be spaced from the bottom panel 18, e.g., the upper surface 52. Alternatively, the floor cross member 66 may be disposed below the floor 12. For example, the floor cross member 66 may be external to the cavity 20 and abut the lower surface 54 of the bottom panel 18. In this situation, the floor cross member 66 may abut the vehicle frame 26, e.g., the first rail 28 and the second rail 30.

Figure 3C:
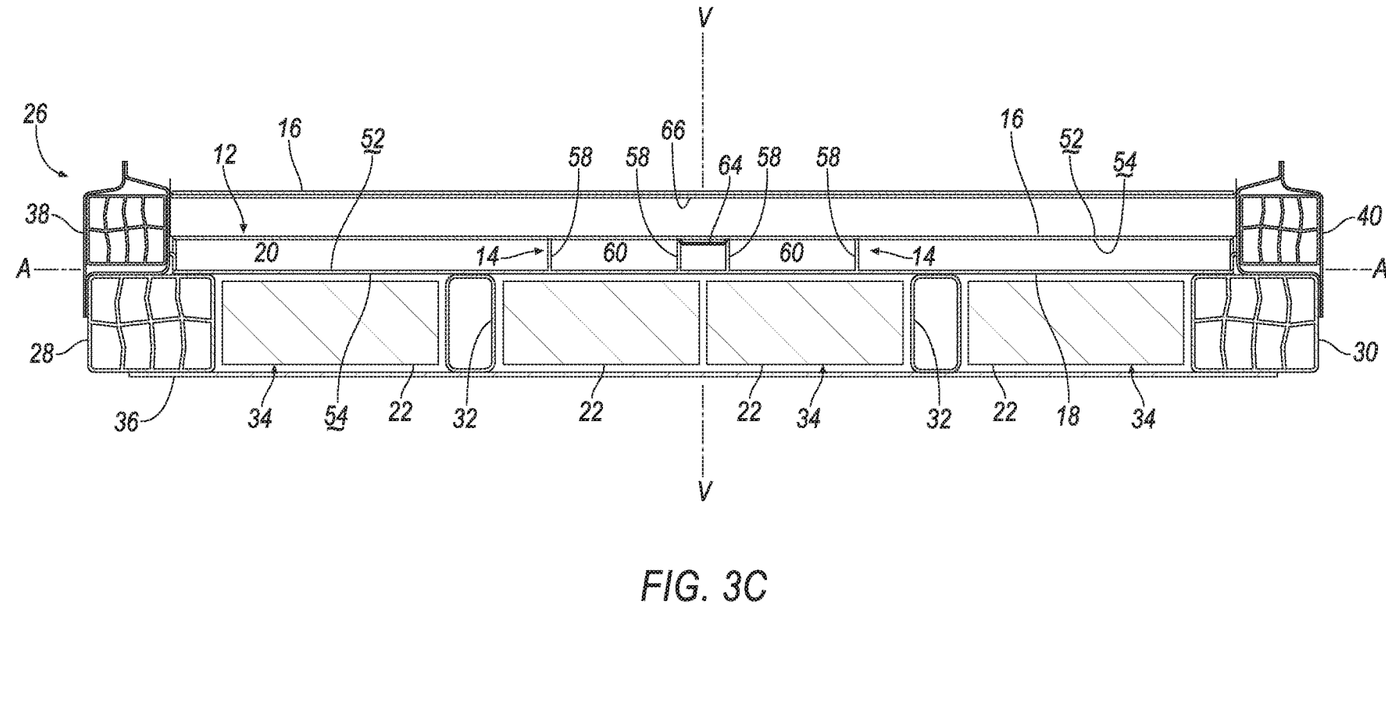
FIG. 3C is a cross-section view of the vehicle frame and the floor along line 3C.

The floor cross member 66 may, for example, be integral with the at least one of the top panel 16 and the bottom panel 18. In other words, the floor cross member 66 and the at least one of the top panel 16 and the bottom panel 18 may be formed together as a single unit. For example, the at least one of the top panel 16 and the bottom panel 18 may be overmolded to the floor cross member 66. In such an example, the top panel 16 may be overmolded to the floor cross member 66, as shown in FIG. 3C. As another example, the floor cross member 66 may be insert molded to the at least one of the top panel 16 and the bottom panel 18. Alternatively, the floor cross member 66 and the at least one of the top panel 16 and the bottom panel 18 may be separately formed and subsequently assembled together, e.g., fixed together by fasteners, welding, etc. In this situation, the floor cross member 66 may be any suitable material, e.g., plastic, metal, etc.

The body 24 may include seat mounts 68. The seat mounts 68 are configured to be engaged with occupant seats to mount the seats to the body 24 adjacent to the planar portion 56. The seat mounts 68 may be adjacent to the top panel 16. For example, the seat mounts 68 may be supported by the floor cross member 66, as shown in the Figures. As another example, the seat mounts 68 may be disposed directly on the upper surface 52 of the top panel 16, i.e., in the passenger cabin 42. As yet another example, the seat mounts 68 may be disposed in the cavity 20, e.g., abutting the lower surface 54 of the top panel 16.

When supported by the floor cross members, the seat mounts 68 may be on the floor cross member 66. In such an example, the seat mounts 68 are directly connected to the floor cross member 66, e.g., by welds, threaded fasteners, etc. As another example, the seat mounts 68 may be integral with the floor cross member 66. In other words, the seat mounts 68 and the floor cross member 66 may be formed together as a single unit. For example, the floor cross member 66 and may be overmolded to the seat mount 68. As another example, the seat mount 68 may be insert molded to the floor cross member 66. Alternatively, the seat mounts 68 may be separate from and fixed relative to the floor cross member 66.

The seat mounts 68 may, for example, be integral with the top panel 16. In other words, the seat mounts 68 and the top panel 16 may be formed together as a single unit. For example, the top panel 16 may be overmolded to the seat mount 68. As another example, the seat mount 68 may be insert molded to the top panel 16. Alternatively, the seat mounts 68 and the top panel 16 may be separately formed and subsequently assembled together, e.g., fixed together by fasteners, welding, etc. In this situation, the seat mounts 68 may be any suitable material, e.g., plastic, metal, etc.

When non-electric, the vehicle 10 may include an underbody shield (not shown) on the bottom panel 18. Specifically, the underbody shield may be disposed on the lower surface 54 of the bottom panel 18, i.e., the underbody shield may face a road. The underbody shield may extend any suitable amount along the longitudinal axis L and the lateral axis A. The vehicle 10 may include any suitable number of underbody shields. The underbody shield may be formed of any suitable material, e.g., plastic, metal, etc. The underbody shield may protect the underbody from damage due to debris on the road.

The underbody shield may, for example, be integral with the bottom panel 18. In other words, the underbody shield and the bottom panel 18 may be formed together as a single unit, e.g., the underbody shield insert molded into the bottom panel 18. Alternatively, the underbody shield and the bottom panel 18 may be separately formed and subsequently assembled together. In such an example, the underbody shield may be fixed to the bottom panel 18 of the floor 12, e.g., by fasteners, welding, etc.

When electric, the batteries 22 may be disposed below the bottom panel 18 of the floor 12. In other words, the bottom panel 18 of the floor 12 may be disposed between the batteries 22 and the top panel 16 of the floor 12. Specifically, the lower surface 54 of the bottom panel 18 may be disposed adjacent to and face the batteries 22. In this situation, the vehicle 10 may include a foil sheet (not shown) on the bottom panel 18. The foil sheet may, for example, be on the lower surface 54 of the bottom panel 18, e.g., facing the batteries 22. The foil sheet may extend over the batteries 22, e.g., along the longitudinal axis L and the lateral axis A. The foil sheet may be thin along the vertical axis V, e.g., thinner than the bottom panel 18. The foil sheet may protect the batteries 22 from electrical current, e.g., from other vehicle components. The foil sheet may be any suitable metal.

The foil sheet may be integral with the bottom panel 18. In other words, the foil sheet and the bottom panel 18 may be formed together as a single unit. In this situation, the bottom panel 18 may be molded to the foil sheet. In other words, the foil sheet may be insert molded into the bottom panel 18. Alternatively, the foil sheet and the bottom panel 18 may be separately formed and subsequently assembled together. In this situation, the foil sheet may be fixed to the bottom panel 18 of the floor 12, e.g., by fasteners, welding, etc.

Additionally, when the vehicle 10 is electric, the vehicle 10 may include a cooling duct (not shown) disposed in the cavity 20. The cooling duct may be separate from the passenger-climate-control duct 14. In other words, the vehicle 10 may have separate controls for directing air through the cooling duct as compared to the passenger-climate-control duct 14. The cooling duct may extend along the bottom panel 18 directly above the batteries 22. In other words, the cooling duct may be aligned with the batteries 22 along the longitudinal axis L. In this situation, the cooling duct may assist in maintaining a temperature of the batteries 22. The cooling duct may extend from the bottom panel 18 towards the top panel 16, e.g., along the vertical axis V.

The cooling duct may be integral with the bottom panel 18. In other words, the cooling duct and the bottom panel 18 may be formed together as a single unit. For example, the cooling duct and the bottom panel 18 may be injection molded plastic. As another example, the cooling duct and the bottom panel 18 may be extruded plastic. As another example, the bottom panel 18 may be overmolded to the cooling duct. As yet another example, the cooling duct may be insert molded to the bottom panel 18. Alternatively, the cooling duct and the bottom panel 18 may be separately formed and subsequently assembled together. In this situation, the cooling duct may be fixed to the bottom panel 18 of the floor 12, e.g., by fasteners, welding, etc. The cooling duct may be any suitable material, e.g., plastic, metal, etc.

In use, as set forth above, the at least one of the top panel 16 and the bottom panel 18 includes polymeric material, which allows for integration of vehicle components. For example, the passenger-climate-control duct 14 is integral to the floor 12, e.g., at least one of the top panel 16 and the bottom panel 18. Specifically, the passenger-climate-control duct 14 is disposed in the cavity 20. The cavity 20 allows vehicle components to be disposed on the floor 12 of the vehicle 10 and external to the passenger cabin 42, e.g., below the top panel 16. For example, the cavity 20 may house the vehicle components to, e.g., increase space in the passenger cabin 42, dampen exterior noise, cool the batteries 22, etc. In addition to the passenger-climate-control duct 14, any suitable vehicle component, e.g., seat mounts 68, floor cross members 66, the wire 64, the foil sheet, etc., may be integrated with the floor 12 when one of the top panel 16 and the bottom panel 18 includes the polymeric material. Integrating vehicle components, such as the passenger-climate-control duct 14, with the floor 12 may allow the floor 12 and vehicle components to be unitarily assembled, as set forth above, which may reduce assembly costs.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a floor including a top panel and a bottom panel defining a cavity therebetween, at least one of the top panel and the bottom panel including a polymeric material;
   a passenger-climate-control duct disposed in the cavity and being integral with the at least one of the top panel and the bottom panel; and
   a battery, the bottom panel of the floor disposed between the battery and the top panel of the floor.

2. The vehicle of claim 1, wherein the passenger-climate-control duct extends from the bottom panel to the top panel.

3. The vehicle of claim 1, wherein the passenger-climate-control duct is integral with the bottom panel and connected to the top panel.

4. The vehicle of claim 3, wherein the top panel is sheet molding compound and the bottom panel is injection molded plastic.

5. The vehicle of claim 4, wherein the passenger-climate-control duct is injection molded plastic.

6. The vehicle as set forth in claim 1, wherein the top panel includes a peripheral edge and the bottom panel includes a peripheral edge connected to the peripheral edge of the top panel.

7. The vehicle as set forth in claim 6, further comprising rockers elongated in a vehicle-fore-and-aft direction, the peripheral edges of the top and bottom panels being adjacent both rockers.

8. The vehicle of claim 1, further comprising a body defining a passenger cabin, the passenger-climate-control duct is in fluid communication with the passenger cabin.

9. The vehicle of claim 1, wherein the passenger-climate-control duct extends through the top panel.

10. The vehicle as set forth in claim 1, wherein the top panel is generally planar.

11. The vehicle of claim 1, further comprising a floor cross member adjacent at least one of the top panel and the bottom panel.

12. The vehicle of claim 11, wherein at least one of the top panel and the bottom panel is overmolded to the floor cross member.

13. The vehicle of claim 11, wherein the floor cross member is between the top panel and the bottom panel.

14. The vehicle of claim 11, further comprising a seat mount supported by the floor cross member.

15. The vehicle of claim 14, wherein the top panel includes a planar portion and the seat mount is at the planar portion.

16. The vehicle of claim 1, further comprising a wire, at least one of the top panel and the bottom panel being molded to the wire.

17. The vehicle of claim 1, further comprising an electrical connection extending through the top panel and a wire connected to the electrical connection and extending along at least one of the top panel and the bottom panel.

18. The vehicle of claim 1, further comprising a foil sheet on the bottom panel.

19. The vehicle of claim 1, further comprising temperature-insulating material disposed in the cavity external to the passenger-climate-control duct.

20. A vehicle comprising:
   a floor including a top panel and a bottom panel defining a cavity therebetween, at least one of the top panel and the bottom panel including a polymeric material;
   a passenger-climate-control duct disposed in the cavity and being integral with the at least one of the top panel and the bottom panel; and
   temperature-insulating material disposed in the cavity external to the passenger-climate-control duct.

* * * * *